United States Patent
Terada et al.

(10) Patent No.: US 7,511,448 B2
(45) Date of Patent: Mar. 31, 2009

(54) MOTOR CONTROL DEVICE

(75) Inventors: Kei Terada, Tokyo (JP); Tetsuaki Nagano, Tokyo (JP); Yasunobu Harada, Tokyo (JP); Kazutaka Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 10/585,416

(22) PCT Filed: Jan. 7, 2004

(86) PCT No.: PCT/JP2004/000028

§ 371 (c)(1),
(2), (4) Date: Sep. 4, 2008

(87) PCT Pub. No.: WO2005/067137

PCT Pub. Date: Jul. 21, 2005

(65) Prior Publication Data

US 2008/0309265 A1  Dec. 18, 2008

(51) Int. Cl.
*H02P 27/04* (2006.01)

(52) U.S. Cl. .................. 318/807; 318/700; 318/400.01; 318/400.07; 318/721; 318/724; 700/12; 700/13; 700/32; 700/33; 700/34

(58) Field of Classification Search ............ 318/400.01, 318/400.07, 400.13, 400.27, 700, 721, 724, 318/801; 700/12, 13, 28, 32, 33, 34
See application file for complete search history.

(56) References Cited

U.S. PATENT DOCUMENTS

| | | | | |
|---|---|---|---|---|
| 4,047,083 A | * | 9/1977 | Plunkett | 318/807 |
| 5,038,090 A | * | 8/1991 | Kawabata et al. | 318/721 |
| 5,124,625 A | * | 6/1992 | Wakabayashi | 318/603 |
| 5,834,918 A | * | 11/1998 | Taylor et al. | 318/601 |
| 6,316,905 B1 | * | 11/2001 | Depenbrock | 318/801 |
| 6,531,843 B2 | * | 3/2003 | Iwaji et al. | 318/727 |
| 6,737,828 B2 | * | 5/2004 | Kiuchi et al. | 318/779 |
| 6,794,839 B1 | * | 9/2004 | Maslov et al. | 318/400.2 |
| 7,076,340 B1 | * | 7/2006 | Inazumi et al. | 700/298 |

FOREIGN PATENT DOCUMENTS

| | | |
|---|---|---|
| EP | 1198059 A2 | 4/2002 |
| JP | 60-148394 A | 8/1985 |

(Continued)

*Primary Examiner*—Rita Leykin
(74) *Attorney, Agent, or Firm*—Sughrue Mion, PLLC

(57) ABSTRACT

In a motor control device according to the invention, upon velocity control of a motor, a superimposed signal generating unit 9 outputs a superimposed signal idh of a repetitive waveform, such as a triangular wave or a sine wave. A d-axis current command generating unit 10 adds the superimposed signal idh generated by the superimposed signal generating unit $9d$ to a d-axis current command idc*0 and outputs a d-axis current command idc*. An axial misalignment detecting unit 11 (11a, 11b, 11c, and 11d) receives the d-axis current command idc* and a q-axis current command iqc* and outputs an axial misalignment angle estimation value $\Delta\theta\hat{}$. An axial misalignment correction unit 12 receives the axial misalignment angle estimation value $\Delta\theta\hat{}$ and an actual detected position θm and outputs a position after correction θm'. Therefore, detection and correction can be performed in real time through calculation at a given timing during a normal operation.

17 Claims, 10 Drawing Sheets

FOREIGN PATENT DOCUMENTS

| JP | 10-323099 A | 12/1998 |
| JP | 2000-102299 A | 4/2000 |
| JP | 2001-69799 A | 3/2001 |
| JP | 2001-204190 A | 7/2001 |
| JP | 2003-153582 A | 5/2003 |
| JP | 2003-348896 A | 12/2003 |

* cited by examiner

MOTOR CONTROL DEVICE

TECHNICAL FIELD

The present invention generally relates to a motor control device that controls a synchronous motor, and more particularly, to a motor control device having an axial misalignment detecting unit for detecting an axial misalignment angle between a dq-axis of a synchronous motor, which is to be a control object, and a dq-axis for control.

BACKGROUND ART

As a servo control of a synchronous motor, a vector control that separates a current in a field magnetic flux direction (d-axis) of the motor and a direction perpendicular to the field magnetic flux direction (q-axis) and performs current control for the d axis and the q-axis is generally performed. In the vector control, it is necessary to detect magnetic pole positions in order to generate a torque effectively.

A linear motor is often used in combination with an incremental encoder that cannot detect an absolute position of the motor at the time of power activation. Since the incremental encoder can detect only a relative position, it is necessary to detect an initial magnetic pole position. If accuracy of the initial magnetic pole position detection is poor, an axial misalignment phenomenon that a dq-axis (a dm-pm axis) of an actual motor and a dq-axis (a dc-qc axis) for control are misaligned occurs. Accordingly, an adverse effect, such as degradation of torque control accuracy or a reduction in a maximum torque, occurs.

When an absolute encoder is used, it is not necessary to detect the initial magnetic pole position since an absolute position can be detected. If mounting accuracy is low, axial misalignment also occurs.

A technique for estimating offset of the magnetic pole position when the encoder is mounted on the synchronous motor is an example of the related art, and is disclosed in Patent Document 1 (JP-A-2001-204190).

Patent Document 1 discloses an error adjusting device that adjusts an error based on an initial magnetic pole position estimation value of a synchronous motor that includes a unit for calculating an initial magnetic pole position of a rotator. Here, a command torque current among a two-phase command current is set to zero and a command magnetic flux current is set to a predetermined finite repetitive waveform. Then, an angular acceleration is calculated based on a detection velocity. An occurrence torque is estimated based on information, such as the command magnetic flux current, a detection velocity, the angular acceleration, and an inertia, viscous friction, and a friction torque of the motor according to a motor motion equation. A torque current is estimated by dividing the estimated torque by a torque constant. An initial magnetic pole position is estimated based on the command magnetic flux current and the estimated torque current. Finally, the estimation result is displayed.

As another example of the related art that estimates a magnetic pole position of a rotator in position-sensorless control of a salient pole type synchronous motor and performs control based on the estimated magnetic pole position value, a motor control device is disclosed in Patent Document 2 (JP-A-10-323099).

Patent Document 2 discloses the motor control device that has a unit for applying an AC current signal for estimation or an AC voltage signal for estimation in one axial direction of an orthogonal two-axis coordinate system and estimating a magnetic pole position of the synchronous motor based on a current or voltage in the other axial direction of the orthogonal two-axis coordinate system. The magnetic pole position estimation unit estimates the magnetic pole position using a current or voltage value, which is detected at a timing of a predetermined phase with respect to the AC current signal for estimation or the AC voltage signal for estimation.

In the initial magnetic pole position estimation device disclosed in Patent Document 1, an offset angle of an initial magnetic pole position when the encoder is mounted on the AC synchronous motor is accurately estimated according to an initial magnetic pole estimation equation and the estimated offset angle is displayed. Accordingly, the initial magnetic pole position can be correctly controlled. However, since estimation can be carried out only when a command torque current (q-axis current command iqc*) is zero, the initial magnetic pole position estimation device cannot perform estimation during a normal operation, such as velocity control.

In the initial magnetic pole position estimation device disclosed in Patent Document 1, a series of works for displaying an axial misalignment angle, mounting the encoder again, and then estimating the axial misalignment angle must be repeatedly performed. Accordingly, there is a problem in that an inefficient work occurs.

In the initial magnetic pole position estimation device disclosed in Patent Document 1, a division is used for a process of estimating the axial misalignment angle. Therefore, there is a problem in that robustness against noise, friction variation, disturbance load, and/or the like is low.

In the initial magnetic pole position estimation device disclosed in Patent Document 1, parameters, such as inertia or friction, are required in order to estimate the axial misalignment angle. Accordingly, there is a problem in that estimation accuracy is significantly low when accurate parameters are not found.

In the motor control device disclosed in Patent Document 2, a magnetic pole position of the synchronous motor can be simply estimated by detecting a current, which flows according to the signal for estimation, in the other axial direction of the orthogonal two-axis coordinate system at a predetermined phase, and performing a multiplication operation on the detected current. However, the motor control device cannot detect an actual velocity shift or position movement since it does not include a velocity detecting unit or a position detecting unit and cannot employ velocity feedback information. Accordingly, the disclosed motor control device has a problem in that accuracy of magnetic pole position estimation is rarely improved.

The motor control device disclosed in Patent Document 2 has a problem in that it is rarely applied to a motor not having an electrical saliency or having a small electrical saliency, since it uses the electrical saliency.

In the motor control device disclosed in Patent Document 2, only a current feedback can be used since an electrically closed property is used (a current command cannot be used). Accordingly, the disclosed motor control device has a problem in that it is affected by current detection noise.

In the motor control device disclosed in Patent Document 2, a superimposed signal and a detection signal do not have the same phase. Accordingly, there is a problem in that a sequence is complicated since a solution for detecting the superimposed signal and the detection signal at specific phase timings, a solution for calculating a peak value or a shift rate, and so on are required.

The invention has been made in order to solve the above-described problems, and it is a first object of the invention to provide a motor control device that can estimate an initial magnetic pole position even during a normal operation, such as velocity control or the like, in vector control of a synchronous motor by a simple configuration.

It is a second object of the invention to provide a motor control device that does not use a division to estimate an axial misalignment value.

It is a third object of the invention to provide a motor control device that can estimate an initial magnetic pole position even, without using motor parameters.

It is a fourth object of the invention to provide a motor control device that can obtain data required to estimate an axial misalignment angle, without using a complex sequence for obtaining a data acquisition timing.

DISCLOSURE OF THE INVENTION

A motor control device according to the invention includes a velocity calculation unit that calculates an actual velocity from a detected position, that is, a position of a motor or of a load connected to the motor detected by a detector, a velocity control unit that performs velocity control to cause the actual velocity to follow a velocity command and outputs a q-axis current command, a uvw/dq coordinate converting unit that receives a three-phase current detected in an inverter, performs coordinate conversion from a uvw three-phase coordinate system at rest into a dq synchronous rotation coordinate system, and outputs a d-axis current and a q-axis current, a current control unit that receives a d-axis current command, the q-axis current command, the d-axis current feedback, and the q-axis current feedback, performs current control such that a dq-axis current detection value coincides with a dq-axis current command, and outputs a d-axis voltage command and a q-axis voltage command, a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command, an inverter receives the three-phase voltage command, applies an actual three-phase voltage to the motor, and drives the motor at a variable velocity, a superimposed signal generating unit that outputs a superimposed signal of a repetitive waveform, such as a triangular wave or a sine wave, a d-axis current command generating unit that adds the superimposed signal generated by the superimposed signal generating unit to the d-axis current command and outputs the d-axis current command, and an axial misalignment detecting unit that receives the d-axis current command and the q-axis current command output from the velocity control unit and outputs an axial misalignment angle estimation value. Accordingly, it is not necessary to use an actual current in axial misalignment detection. Then, detection can be performed with high accuracy only by a configuration in which the axial misalignment detecting unit is added to a general servo control loop with no influence by current detection noise. Further, since the velocity control system is included, axial misalignment can be detected at a nearly static state since velocity variation does not exist when axial misalignment does not exit. In addition, in axial misalignment detection, the d-axis current command and the q-axis current command or data having substantially aligned phases (the same phase or opposing phases), such as torque current error, are used. Accordingly, detection can be performed in real time through calculation at a given timing during a normal operation.

The motor control device further includes a position control unit that receives a position command and the detected position detected by the detector, performs position control to cause the detected position to follow the position command, and outputs a velocity command to the velocity control unit. The superimposed signal generating unit may output the superimposed signal of the repetitive waveform, such as a triangular wave or a sine wave. Therefore, axial misalignment can be detected while performing a common position control operation. Further, since the motor control device includes the position loop, there is no possibility that a final absolute position after axial misalignment detection or correction may be misaligned. The motor control device having this configuration may be applied to a case where correction is required while securing an initial absolute position, a case where a position is not moved from an initial position, and so on. In addition, deviation with respect to an absolute position and a position command can be monitored. Therefore, it is possible to cope with such cases as the stop of an operation through alarming when offset is excessive, the change of the superimposed signal depending on an amount of offset, and so on.

A motor control device according to the invention includes a velocity calculation unit that calculates an actual velocity from a detected position, that is, a position of a motor or of a load connected to the motor detected at a detector, a uvw/dq coordinate converting unit that receives a three-phase current detected in an inverter, performs coordinate conversion from a uvw three-phase coordinate system at rest into a dq synchronous rotation coordinate system, and outputs a d-axis current and a q-axis current, a current control unit that receives a d-axis current command, a q-axis current command, the d-axis current feedback, and the q-axis current feedback, performs current control such that a dq-axis current detection value coincides with a dq-axis current command, and outputs a d-axis voltage command and a q-axis voltage command, a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command, an inverter that receives the three-phase voltage command, applies an actual three-phase voltage to the motor, and drives the motor at a variable velocity, a superimposed signal generating unit that outputs a superimposed signal of a repetitive waveform, such as a triangular wave or a sine wave, a d-axis current command generating unit that adds the superimposed signal idh generated by the superimposed signal generating unit to the d-axis current command and outputs the d-axis current command, a torque current error calculation unit that receives the actual velocity output from the velocity calculation unit and the q-axis current command and estimates a torque current error actually occurring in the motor, and an axial misalignment detecting unit that receives the d-axis current command and the torque current error and outputs an axial misalignment angle estimation value. Therefore, the motor control device having this configuration can be used in a normal operation state including a torque command. Further, accurate axial misalignment detection can be performed even when an absolute value of an axial misalignment angle is 90 degrees or more because a calculation value of the torque current error, not a q-axis current command, is employed.

The motor control device further includes a velocity control unit that performs velocity control to cause the actual velocity to follow a velocity command and outputs the q-axis current command. The superimposed signal generating unit may output the superimposed signal of the repetitive waveform, such as a triangular wave or a sine wave. Therefore, the torque current error of the actual motor can be calculated based on the actual velocity, and axial misalignment can be detected using the torque current error. Accordingly, axial misalignment detection can be performed even when a velocity control response is not made and a velocity control band is low.

The motor control device includes an axial misalignment correction unit that receives the axial misalignment angle estimation value output from the axial misalignment detecting unit and the detected position detected by the detector, calculates a position after correction, and outputs the calculated position to the dq/uvw coordinate converting unit and the uvw/dq coordinate converting unit. In this case, the dq/uvw coordinate converting unit and the uvw/dq coordinate converting unit may perform coordinate conversion based on the position after correction. Therefore, workability can be improved since it is not necessary to mount the encoder again that has been already mounted. Further, in the axial misalignment detection, the d-axis current command and the q-axis current command or data having substantially aligned phases (the same phase or opposing phases), such as the torque current error, are used. Accordingly, correction can be carried out in real time through calculation at a given timing during a normal operation.

The axial misalignment detecting unit has a first input filter that filters the d-axis current command and outputs a d-axis signal for axial misalignment detection, a second input filter that filters the q-axis current command or torque current error and outputs a q-axis signal for axial misalignment detection, an adaptive input calculation unit that calculates an adaptive input by multiplying the d-axis signal for axial misalignment detection and the q-axis signal for axial misalignment detection, a gain unit that multiplies the adaptive input by a gain and generates an integral input, and an integrator that integrates the integral input and outputs the axial misalignment angle estimation value. Therefore, only the signals required for axial misalignment detection can be separated using the filters. Accordingly, the motor control device having this configuration can detect and correct axial misalignment even during a common driving operation (a velocity control operation). The motor control device is not influenced by motor parameter error because an initial magnetic pole position can be estimated even without using the motor parameter.

The axial misalignment detecting unit has a first input filter that filters the d-axis current command and outputs a d-axis signal for axial misalignment detection, a variable gain calculation unit that calculates a function of the d-axis signal for axial misalignment detection, a second input filter that filters the q-axis current command or torque current error and outputs a q-axis signal for axial misalignment detection, an adaptive input calculation unit that calculates an adaptive input by multiplying the function of the d-axis signal for axial misalignment detection and the q-axis signal for axial misalignment detection, and an integrator that integrates the integral input and outputs the axial misalignment angle estimation value. Accordingly, the motor control device having this configuration can easily improve accuracy and a convergence velocity according to a writing method of the function calculated in the variable gain calculation unit.

The axial misalignment detecting unit has a first input filter that filters the d-axis current command and outputs a d-axis signal for axial misalignment detection, a first sign detector that detects a sign of the d-axis signal for axial misalignment detection and outputs a sign-added d-axis signal for axial misalignment detection, a second input filter that filters the q-axis current command or torque current error and outputs a q-axis signal for axial misalignment detection, a second sign detector that detects a sign of the q-axis signal for axial misalignment detection and outputs a sign-added q-axis signal for axial misalignment detection, an adaptive input calculation unit that calculates a sign-added adaptive input by multiplying the sign-added d-axis signal for axial misalignment detection and the sign-added q-axis signal for axial misalignment detection, a gain unit that multiplies the sign-added adaptive input by a gain and generates an integral input, an integrator that integrates the integral input and outputs the axial misalignment angle estimation value. Accordingly, the motor control device having this configuration becomes invulnerable to pulse type disturbance.

The axial misalignment detecting unit has a first input filter that filters the d-axis current command and outputs a d-axis signal for axial misalignment detection, a second input filter that filters the q-axis current command or torque current error and outputs a q-axis signal for axial misalignment detection, an estimation output calculation unit that multiplies the d-axis signal for axial misalignment detection extracted by the input filter and the axial misalignment angle estimation value to be described below, and outputs an estimation output, an axial misalignment error calculation unit that finds a difference between the q-axis signal for axial misalignment detection extracted by the second input filter and the estimation output from the estimation output calculation unit, and outputs an axial misalignment error, a variable gain unit that multiplies the axial misalignment error output from the axial misalignment error calculation unit by a gain and outputs an integral input, and an integrator that integrates the integral input output from the variable gain unit to obtain the axial misalignment angle estimation value. Therefore, the motor control device having this configuration can prohibit an influence of noise and can perform the axial misalignment detection with high accuracy. Further, the motor control device having this configuration can perform the detection while performing correction in real time, can perform only the detection of the axial misalignment angle without correction, and find wide applications.

A motor control device according to the invention includes a velocity calculation unit that calculates an actual velocity from a detected position that is a position of a motor or of a load connected to the motor detected by a detector, a uvw/dq coordinate converting unit that receives a three-phase current detected in an inverter, performs coordinate conversion from a uvw three-phase coordinate system at rest into a dq synchronous rotation coordinate system, and outputs a d-axis current and a q-axis current, a current control unit that receives a d-axis current command, a q-axis current command, the d-axis current feedback, and the q-axis current feedback, performs current control such that a dq-axis current detection value coincides with a dq-axis current command, and outputs a d-axis voltage command and a q-axis voltage command, a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command, an inverter that receives the three-phase voltage command, applies an actual three-phase voltage to the motor, and drives the motor at a variable velocity, a superimposed signal generating unit that sets the q-axis current command to zero and outputs a superimposed signal of a repetitive waveform, such as a triangular wave or a sine wave, a d-axis current command generating unit that adds the superimposed signal generated by the superimposed signal generating unit to the d-axis current command and outputs a d-axis current command, an axial misalignment detecting unit that receives the d-axis current command and the q-axis current command and outputs an axial misalignment angle estimation value, a display unit that displays the axial misalignment angle estimation value, a memory that stores the axial misalignment angle estimation value, and an axial misalignment correction unit that receives the axial misalignment angle estimation value stored in the memory and the detected position, and outputs a position after correction. Accordingly, the motor control device having this configuration can omit a series of works of estimating an axial misalignment angle again after an encoder is mounted.

BEST MODE FOR CARRYING OUT THE INVENTION

First Embodiment

Figure 1:
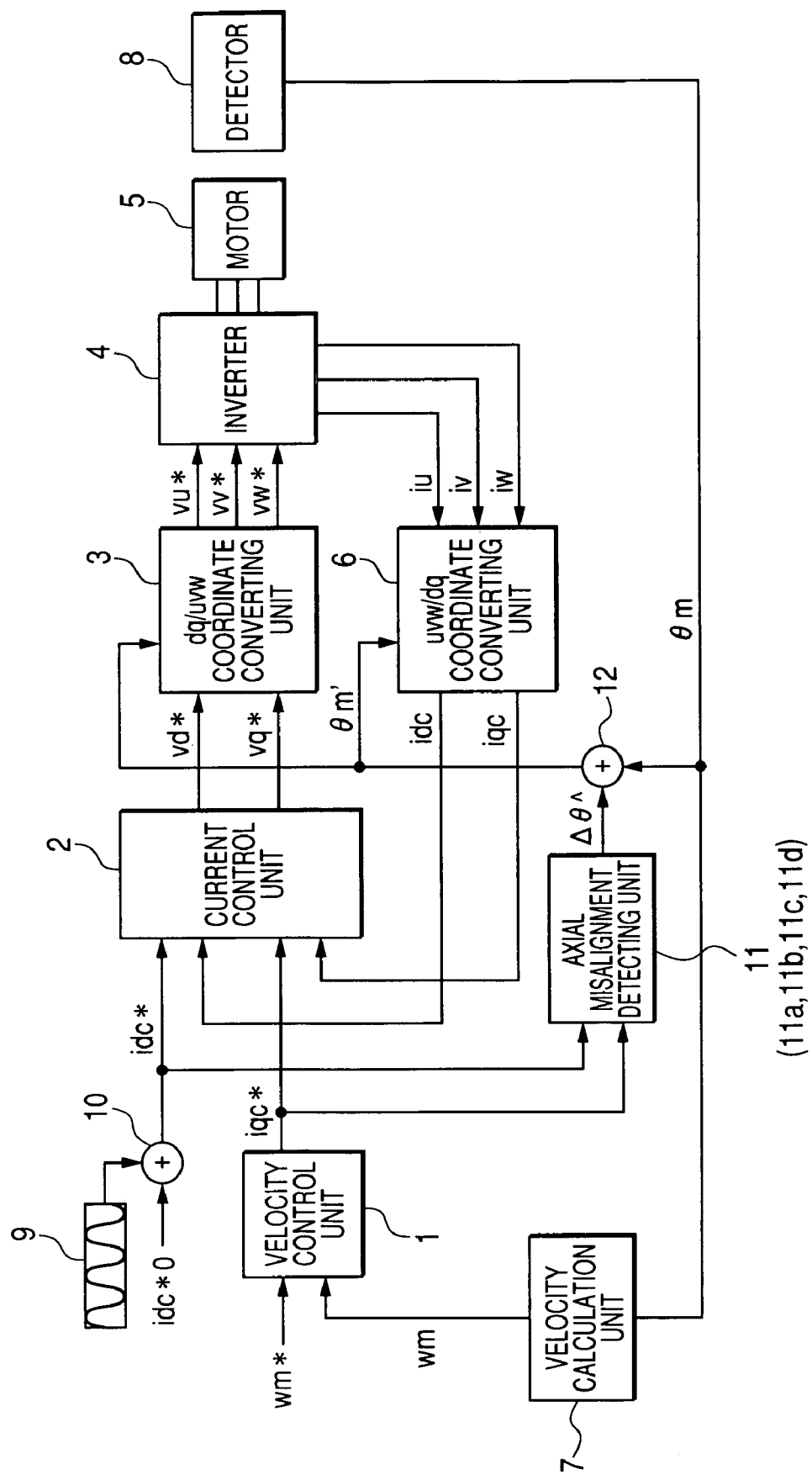
FIG. 1 is a block diagram showing the configuration of a motor control device according to a first embodiment of the invention.
Figure 2:
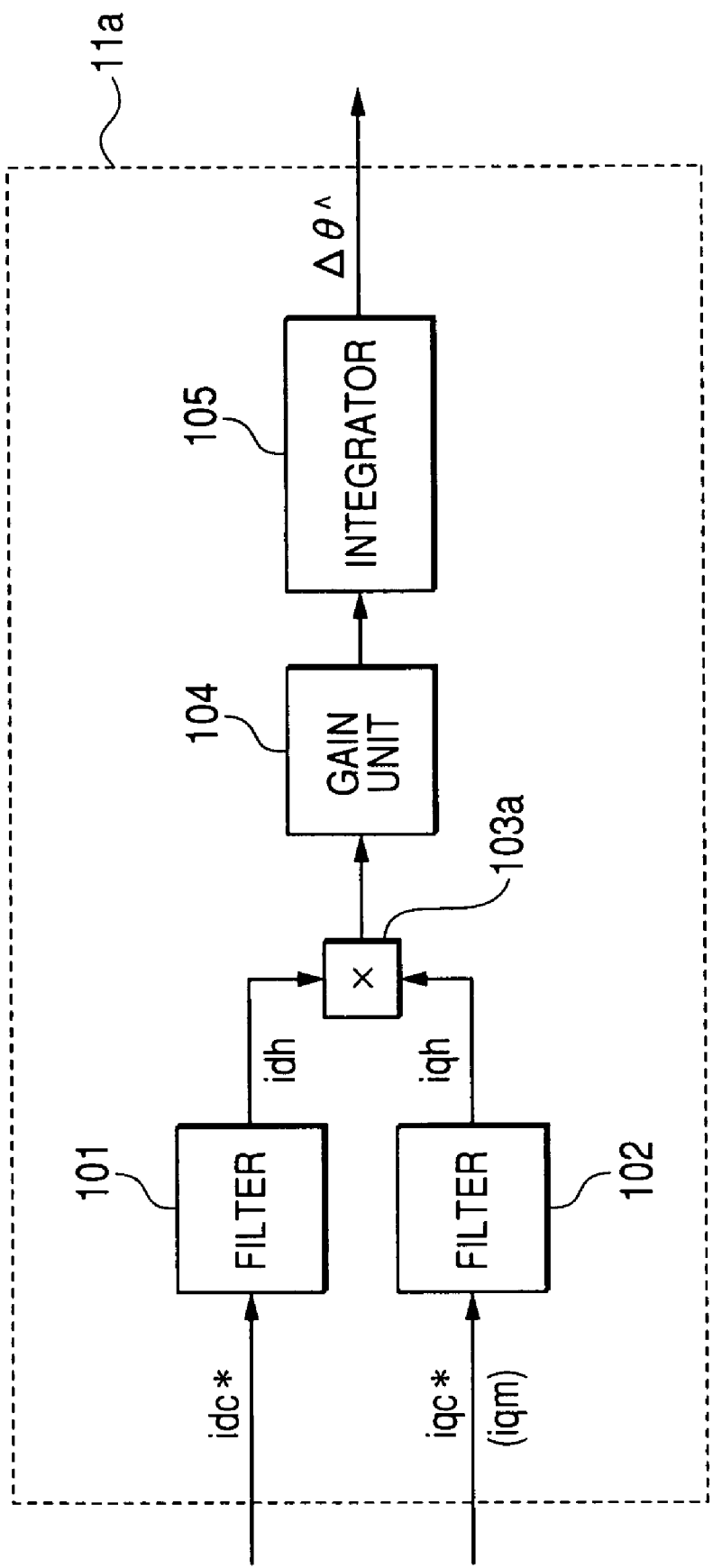
FIG. 2 is a block diagram showing an example of the configuration of an axial misalignment detecting unit 11a in the motor control device according to the first embodiment of the invention.
Figure 3A:
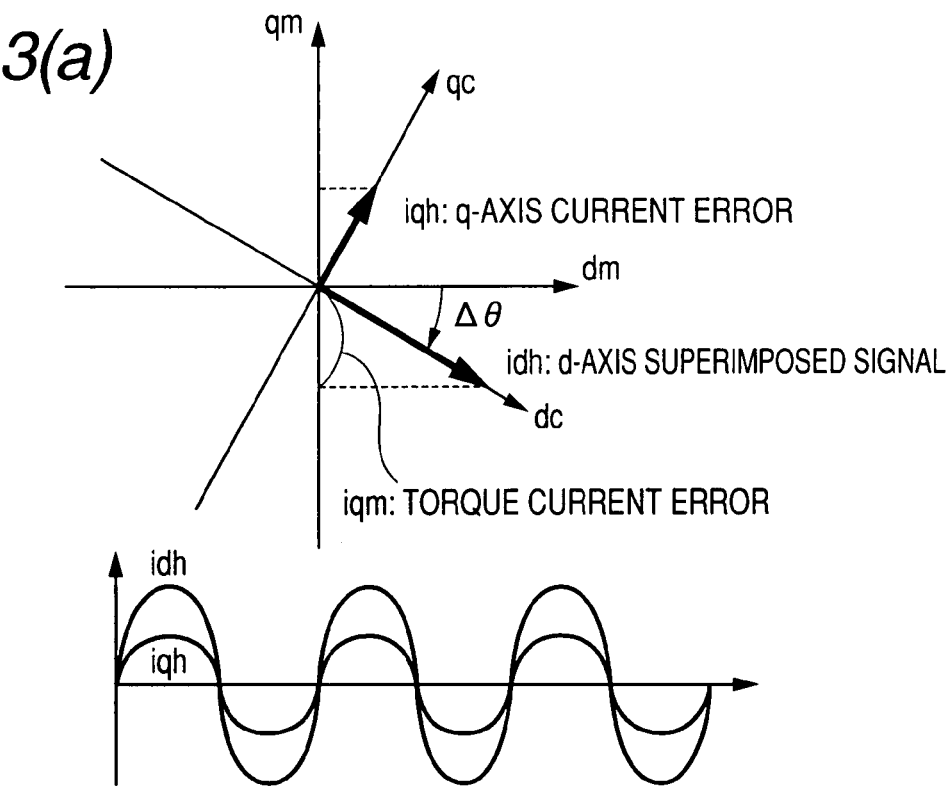
FIG. 3 is a diagram illustrating the relationship between a dq-axis (dm-qm axis) of an actual motor and a dq-axis (dc-qc axis) for control.
Figure 3B:
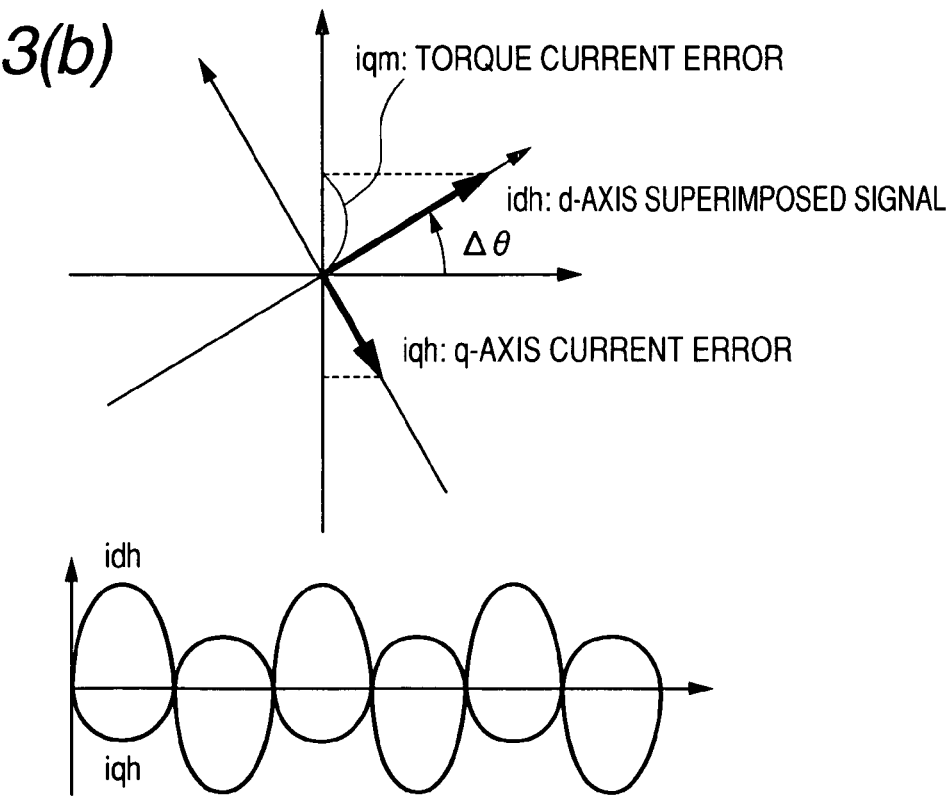

FIG. 1 is a block diagram showing the configuration of a motor control device according to a first embodiment of the invention. FIG. 2 is a block diagram showing an example of the configuration of an axial misalignment detecting unit 11a in the motor control device according to the first embodiment of the invention. FIG. 3 is a diagram illustrating the relationship between a dq-axis (dm-qm axis) of an actual motor and a dq-axis (dc-qc axis) for control.

The processing operation of the motor control device according to the first embodiment will be described below with reference to FIGS. 1 to 3.

In FIG. 1, a velocity control unit 1 receives a velocity command wm* and an actual velocity wm, performs current control to cause the actual velocity wm to follow the velocity command wm* using PI control or the like, and outputs a q-axis current command iqc*. Further, a current control unit 2 receives a d-axis current command idc*, the q-axis current command iqc*, a d-axis current feedback idc, and a q-axis current feedback iqc, performs current control such that a dq-axis actual current coincides with a dq-axis current command, for example, using angular axial PI control, voltage feed forward control (non-interfacial control), or the like, and outputs a d-axis voltage command vd* and a q-axis voltage command vq*. Further, a dq/uvw coordinate converting unit 3 receives the d-axis voltage command vd*, the q-axis voltage command vq*, and a detected position, performs coordinate conversion from a dq synchronous rotation coordinate system into a uvw three-phase coordinate system at rest, and outputs three-phase voltage commands vu*, vv*, and vw*. In addition, an inverter 4 receives the three-phase voltage commands vu*, vv*, and vw*, applies an actual three-phase voltage to a motor 5, and drives the motor 5 at a variable velocity.

Further, a uvw/dq coordinate converting unit 6 receives three-phase currents iu, iv, and iw detected in the inverter 4, performs coordinate conversion from the uvw three-phase coordinate system at rest into the dq synchronous rotation coordinate system, and outputs the d-axis current idc and the q-axis current iqc to the current control unit 2. Further, a velocity calculation unit 7 calculates the actual velocity wm using a difference and a filter from an actual detected position θm, that is, a position of the motor 5 or a load connected to the motor 5 detected by a detector 8, and outputs the calculated actual velocity wm to the velocity control unit 1.

An axial misalignment detection method of motor control of the motor control device according to the first embodiment will now be described.

During velocity control of the motor, a super imposed signal generating unit 9 outputs a superimposed signal idh of a repetitive waveform, such as a triangular wave or a sine wave. A d-axis current command generating unit 10 adds the superimposed signal idh, which is generated by the superimposed signal generating unit 9d, to the d-axis current command idc* 0, and outputs the d-axis current command idc*. Further, an axial misalignment detecting unit 11 (11a, 11b, and 11c) receives the d-axis current command idc* and the q-axis current command iqc*, and output an axial misalignment angle estimation value $\Delta\hat{\theta}$. Further, an axial misalignment correction unit 12 receives the axial misalignment angle estimation value $\Delta\hat{\theta}$ and the actual detected position θm, and outputs a position after correction θm'.

The processing operation of the axial misalignment detecting unit will now be described with reference to FIG. 2.

In FIG. 2, an input filter 101 serving as a first input filter and an input filter 102 serving as a second input filter perform extracting processes on the d-axis current command idc* and the q-axis current command iqc* (or torque current error iqm), respectively, which are input to the axial misalignment detecting unit 11a, and then output a d-axis signal for axial misalignment detection idh and a q-axis signal for axial misalignment detection iqh, respectively. The input filters 101, 102 have common filter characteristics and. As the filter, a bandpass filter for extracting a frequency component used in axial misalignment detection, or the like may be used.

Next, an adaptive input calculation unit 103a multiplies the d-axis signal for axial misalignment detection idh and the q-axis signal for axial misalignment detection iqh to calculate an adaptive input (idh×iqh). A gain unit 104 multiplies the adaptive input (idh×iqh) by a gain and generates an integral input. An integrator 105 integrates the integral input and outputs the axial misalignment angle estimation value ($\Delta\hat{\theta}$).

Assuming that an axial misalignment angle is Δθ, when the AC superimposed signal idh is applied to the d-axis current command idc*, a current error iqm by a torque represented by the following equation (1) occurs in the motor. Preferably, a frequency of the superimposed signal is tens of Hz.

$$iqm = idh \cdot \sin \Delta\theta \quad (1)$$

Here, assuming that the load is an ideal inertia, a velocity shift occurs depending on the torque. Further, if the velocity control system is set, like the first embodiment, and the band of the velocity control system is sufficiently high, a q-axis current shift iqh that cancels the current error iqm by the torque generated by the AC superimposed signal idh is generated.

$$iqh = iqm \cdot \cos \Delta\theta \quad (2)$$

Assuming that the axial misalignment angle is low, the q-axis current shift iqh may approximate to the following equation (3).

$$iqh \approx iqm \approx idh \cdot \Delta\theta \quad (3)$$

The relationship between the dq-axis (dm-qm axis) of an actual motor and the dq-axis (dc-qc axis) for control will now be described with reference to FIG. 3. (a) of FIG. 3 illustrates the relationship when the axial misalignment angle $\Delta\theta$ is $0 < \Delta\theta < \pi/2$ and (b) of FIG. 3 illustrates the relationship when the axial misalignment angle $\Delta\theta$ is $-\pi/2 < \Delta\theta < 0$. As shown in FIG. 3, the d-axis signal for axial misalignment detection idh and the q-axis current shift iqh have the same phase or opposing phases depending on the polarity of $\Delta\theta$. For example, the relationship $\Delta\theta > 0$ is established when the adaptive input (idh×iqh) calculated in the adaptive input calculation unit 103 is positive, and the relationship $\Delta\theta < 0$ is established when the adaptive input (idh×iqh) calculated in the adaptive input calculation unit 103 is negative.

The axial misalignment angle $\Delta\theta$ can adaptively converge on zero (that is, $\Delta\theta \to 0$) by allowing the axial misalignment correction unit 12 shown in FIG. 1 to correct the detected position θm based on the axial misalignment angle estimation value $\Delta\hat{\theta}$ that is obtained by integrating and compensating the adaptive input (idh×iqh) by the gain unit 104 and the integrator 105.

This can be represented by the following equation (4). In the equation (4), 'K' denotes an integral gain, and 's' denotes a differential operator.

$$\text{Axial misalignment Angle Estimation Value } \Delta\hat{\theta} = (K/s) \cdot (idh \times iqh) \quad (4)$$

Through the process, the axial misalignment angle can be detected and corrected.

In the first embodiment, in a case where the d-axis current is applied, the torque is not generated when the dm-qm axis of the motor is aligned with the control dc-qc axis because vector control is properly performed. If the axial misalignment exists, however, the torque is generated since a part of the d-axis current becomes the q-axis current of the motor. For this reason, the axial misalignment is detected using an obtained mechanical response. The axial misalignment detection method according to the first embodiment may be used after roughly inducing the initial axial misalignment angle by about $\pm\pi/2$ or less.

Further, the first embodiment is an example when the q-axis current command iqc* is equal to the torque current error iqm.

In the motor control device according to the first embodiment, an effect of static friction becomes less since the axial misalignment angle is detected upon velocity control. Therefore, the motor control device according to the first embodiment can detect the axial misalignment with high accuracy using a low superimposed signal.

In the motor control device according to the first embodiment, only signals necessary for axial misalignment detection can be extracted using the filters. Therefore, the motor control device according to the first embodiment can detect and correct axial misalignment during a normal driving operation (velocity control operation). Further, for example, if the motor control device according to the first embodiment is used in a state where a velocity is not zero, such as driving of a constant velocity by a return-to-origin operation, there is no influence of static friction. Therefore, the motor control device according to the first embodiment can detect and correct the axial misalignment with very high accuracy using a low superimposed signal.

The motor control device according to the first embodiment includes the velocity control system. Accordingly, the motor control device according to the first embodiment does not generate position movement depending on axial misalignment detection since velocity variation rarely occurs when there is no axial misalignment and it can detect axial misalignment in a nearly stop state when the velocity command is zero or the position command is zero.

In the motor control device according to the first embodiment, an integral term automatically stores in an axial misalignment angle. Therefore, the integral term value can be stored in a memory or the like and can be corrected. As a result, the motor control device according to the first embodiment can improve workability since an encoder that has been mounted once needs not to be mounted again.

The motor control device according to the first embodiment is not influenced by a motor parameter error since it can estimate an initial magnetic pole position even without using motor parameters.

The motor control device according to the first embodiment is advantageous in that a software load can be very small only if the axial misalignment detecting unit is added to a general servo control loop.

The axial misalignment detecting unit in the motor control device according to the first embodiment has a simple configuration including only multiplication and integrator excluding division and arcsine. Therefore, the motor control device according to the first embodiment can perform the correction with high accuracy in real time within a very short period of time since calculation load is reduced. In addition, the axial misalignment can be detected with high accuracy since a value is not directly found using division but axial misalignment is detected adaptively.

The axial misalignment detecting unit in the motor control device according to the first embodiment does not employ an electrical salient pole of the motor since it can employ parameters depending on velocity feedback (mechanical characteristics). Therefore, the motor control device according to the first embodiment can detect the axial misalignment with high accuracy without being influenced by current detection noise and can be applied to non-salient pole motors, such as a surface magnetic motor.

The axial misalignment detecting unit in the motor control device according to the first embodiment uses a current command without using an actual current. Accordingly, the motor control device according to the first embodiment can provide detection with high accuracy without being influenced by current detection noise.

The axial misalignment detecting unit in the motor control device according to the first embodiment uses data whose phases are substantially aligned (the same phase or opposing phases), such as the d-axis current command idc* and the q-axis current command iqc* (or torque current error iqm) as shown in FIG. 3. As a result, there is no need for a solution for detecting a peak value or a shift rate, a solution for detection at a timing of which phase, and so on. Therefore, the motor control device according to the first embodiment can perform detection or correction in real time through calculation at a given timing.

In the first embodiment, an example where the adaptive input (idh×iqh) (that is, a multiplication of the d-axis signal for axial misalignment detection idh and the q-axis current shift iqh) is used has been described. However, when only the q-axis current shift iqh is used, an integral gain K may be changed depending on a sign of the d-axis signal for axial misalignment detection idh or the q-axis current shift iqh.

In the example of the configuration of the axial misalignment detecting unit shown in FIG. 2, when the d-axis current command idc* is high, the integral input is high. This corresponds to a case where the adaptive gain is as high as the input signal. Accordingly, accuracy and a convergence velocity can be improved.

Although an example where the integral compensator is used as the configuration of the axial misalignment detecting unit has been described in the above description, an initial response can be improved if a proportional integral compensator or the like is used.

Second Embodiment

Figure 4:
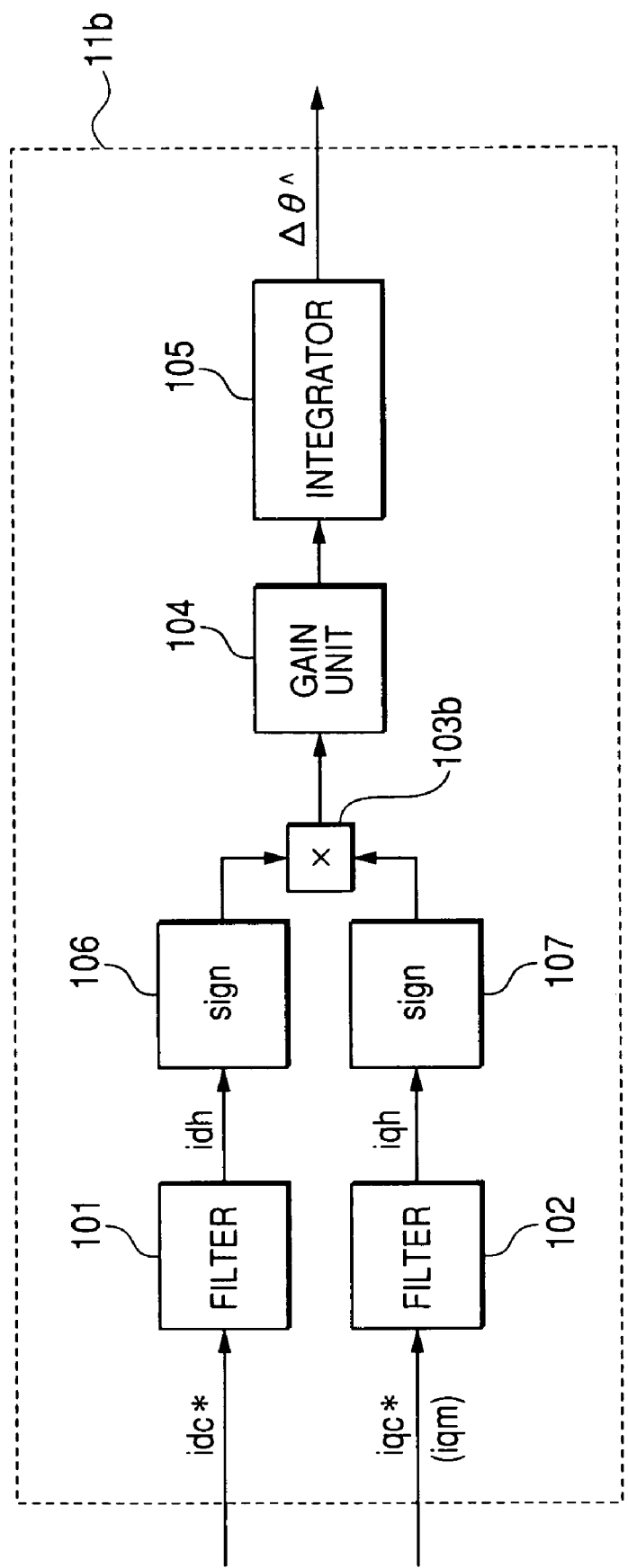
FIG. 4 is a block diagram showing an example of the configuration of an axial misalignment detecting unit 11b in a motor control device according to a second embodiment of the invention.

The processing operation of the axial misalignment detecting unit 11b in the motor control device according to the second embodiment will be described with reference to FIG. 4. In FIG. 4, reference numerals 101, 102, 104, and 105 are the same as those of FIG. 2 and the descriptions thereof will be omitted for simplicity. The axial misalignment detecting unit 11b shown in FIG. 4 further includes a sign detector 106 serving as a first sign detector and a sign detector 107 serving as a second sign detector. The sign detector 106 and the sign detector 107 are interposed between the input filters 101, 102 and the adaptive input calculation unit 103a in the axial misalignment detecting unit 11a shown in FIG. 2.

The sign detectors 106, 107 receive a d-axis signal for axial misalignment detection idh and a q-axis signal for axial misalignment detection iqh, respectively, which are extracted through the input filters 101, 102, respectively, detect signs of the d-axis signal for axial misalignment detection idh and the q-axis signal for axial misalignment detection iqh, respectively, and output a sign-added d-axis signal for axial misalignment detection as a sign idh and a sign-added q-axis signal for axial misalignment detection as a sign iqh to the adaptive input calculation unit 103b, respectively. The adaptive input calculation unit 103b calculates a sign-added adaptive input (idh×iqh) by multiplying the sign-added d-axis signal for axial misalignment detection sign idh and the sign-added q-axis signal for axial misalignment detection sign iqh. A gain unit 104 multiplies the sign-added adaptive input (idh×iqh) by a gain and generates an integral input. The integrator 105 integrates the generated integral input and outputs an axial misalignment angle estimation value $\Delta\hat{\theta}$.

The adaptive input calculation unit 103a of the axial misalignment detecting unit 11a in the motor control device according to the first embodiment calculates the adaptive input (idh×iqh) by multiplying the d-axis signal for axial misalignment detection idh and the q-axis signal for axial misalignment detection iqh that are extracted through the input filters 101, 102, whereas the adaptive input calculation unit 103b of the axial misalignment detecting unit 11b in the motor control device according to the second embodiment multiplies the sign-added d-axis signal for axial misalignment detection sign idh and the sign-added q-axis signal for axial misalignment detection sign iqh (that is, the outputs from the sign detectors 106, 107). However, they have the same operating principle.

In FIG. 4, a case where both the d-axis signal for axial misalignment detection idh and the q-axis signal for axial misalignment detection iqh have signs has been described. However, when one of the d-axis signal for axial misalignment detection idh and the q-axis signal for axial misalignment detection iqh has a sign, the operation is the same though a convergence characteristic is different.

The axial misalignment detecting unit according to the second embodiment includes the sign detectors 106, 107 inserted between the input filters 101, 102 and the adaptive input calculation unit 103a. Therefore, the axial misalignment detecting unit according to the second embodiment can reduce a calculation load. Further, the axial misalignment detecting unit according to the second embodiment is not vulnerable to disturbance of a pulse shape since signs are used.

Although an example where the integral compensator is used has been described in the above description, an initial response can be enhanced if a proportional integral compensator or the like is used.

Third Embodiment

Figure 5:
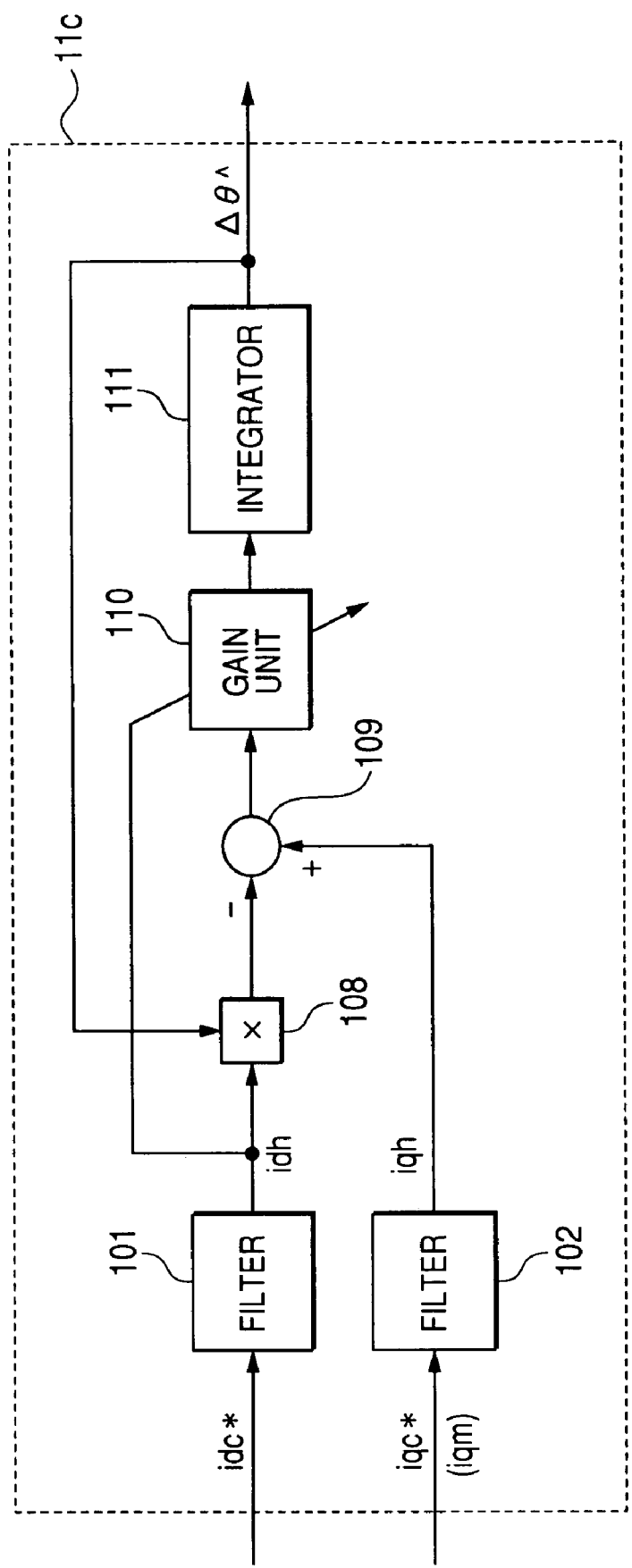
FIG. 5 is a block diagram showing an example of the configuration of an axial misalignment detecting unit 11c in a motor control device according to a third embodiment of the invention.

The processing operation of the axial misalignment detecting unit 11c in the motor control device according to the third embodiment will be described with reference to FIG. 5.

The input filters 101, 102 perform extracting processes on the d-axis current command idc* and the q-axis current command iqc* (or torque current error iqm), respectively, which are input to the axial misalignment detecting unit 11c, and output the d-axis signal for axial misalignment detection idh and the q-axis signal for axial misalignment detection iqh.

An estimation output calculation unit 108 multiplies the d-axis signal for axial misalignment detection idh that is extracted by the input filter 101 and an axial misalignment angle measurement value $\Delta\hat{\theta}$ to be described later, and outputs an estimation output (idh×$\Delta\hat{\theta}$). Further, an axial misalignment error calculation unit 109 outputs axial misalignment error based on a difference between the q-axis signal for axial misalignment detection iqh that is extracted by the input filter 102 and the estimation output (idh×$\Delta\hat{\theta}$) output from the estimation output calculation unit 108. A variable gain unit 110 multiplies the axial misalignment error output from the axial misalignment error calculation unit 109 by a gain and outputs an integral input. An integrator 111 integrates the integral input output from the variable gain unit 110 and outputs an axial misalignment angle estimation value $\Delta\hat{\theta}$.

If the above process is represented by a recurrence formula of a discrete time, the following equation (5) is obtained. A variable gain G employs a fixed gain or the following equation (6). The following equations (5) and (6) are established using a statistical method called a 'fixed trace method'. Further, P0 is a coefficient.

$$\Delta\hat{\theta}\ [k]=\Delta\hat{\theta}\ [k-1]$$

$$+G[k](iqh[k]-idh[k]\cdot\Delta\hat{\theta}\ [k-1]) \quad (5)$$

$$G[k]=P0\cdot iqh[k] \quad (6)$$

In the axial misalignment detecting unit according to the third embodiment, division is not used, but the statistical method is used in axial misalignment detection. Therefore, the axial misalignment detecting unit according to the third embodiment can prohibit the effect of noise and can allow for axial misalignment detection with high accuracy. Further, the axial misalignment detecting unit according to the third embodiment can detect the axial misalignment while correcting it in real time and can find wide applications since it can only output axial misalignment without correction.

Although an example where the integral compensator is used has been described in the above description, an initial response can be enhanced if a proportional integral compensator or the like is used.

Fourth Embodiment

The processing operation of the axial misalignment detecting unit $11d$ in the motor control device according to the fourth embodiment will be described with reference to FIG. 6. The axial misalignment detecting unit $11d$ shown in FIG. 6 has a structure in which a variable gain calculation unit 112 is disposed at the rear of the input filter 101 and the gain 104 is omitted, in the axial misalignment detecting unit $11a$ shown in FIG. 2.

Figure 6:
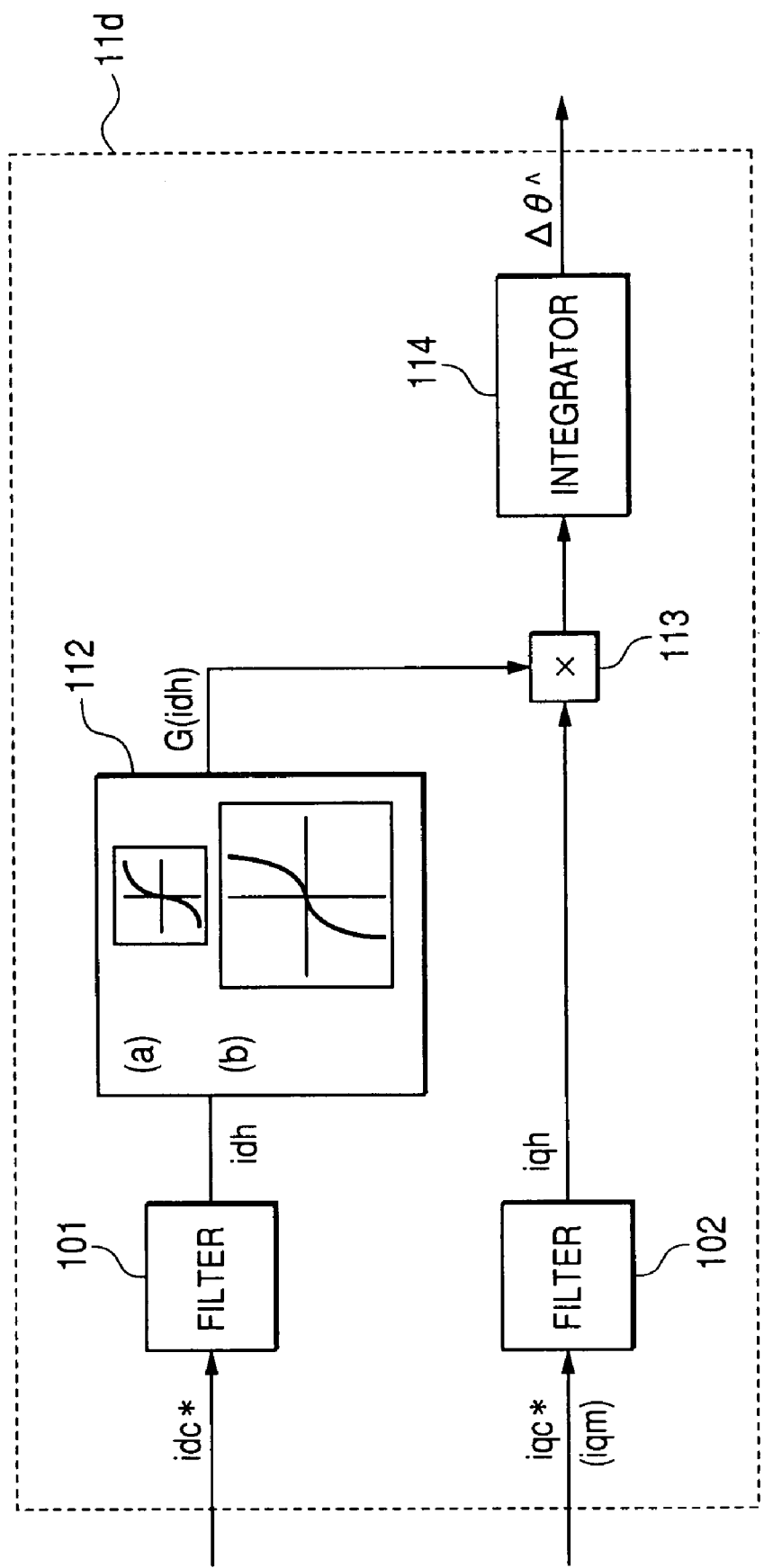
FIG. 6 is a block diagram showing an example of the configuration of an axial misalignment detecting unit 11d in a motor control device according to a fourth embodiment of the invention.

In FIG. 6, the input filter 101 serving as the first input filter performs an extracting process on the d-axis current command idc* input to the axial misalignment detecting unit $11a$ and outputs the d-axis signal for axial misalignment detection idh. The variable gain calculation unit 112 calculates a function G(idh) from the d-axis signal for axial misalignment detection idh output from the input filter 101 according to a function G(idh) or a table. Further, the input filter 102 serving as the second input filter performs an extracting process on the q-axis current command iqc* (or torque current error iqm) input to the axial misalignment detecting unit $11a$ and outputs the q-axis signal for axial misalignment detection iqh. The input filters 101, 102 basically a common extracting characteristic and may use a bandpass filter for canceling frequency components used in an axial misalignment output.

Next, an adaptive input calculation unit 113 multiplies the function G(idh) and the q-axis signal for axial misalignment detection iqh and calculates an adaptive input (G(idh)×iqh). An integrator 114 integrates the adaptive input (G(idh)×iqh) and outputs an axial misalignment angle estimation value $\Delta\hat{\theta}$.

The fourth embodiment can easily improve accuracy and a convergence velocity according to the making method of a function. For example, if fast convergence is required, the gain is increased at a place where idh is high using the function shown in, for example, FIG. 6. It can make fast convergence so that the sensitivity is increased.

In the axial misalignment detecting unit $11d$ of the fourth embodiment, if the function in the function G(idh) unit 112 is set to G(idh)=K×idh, the same configuration as that of FIG. 2 can be obtained.

If the function is set to G(idh)=sign(idh), the same configuration as that of FIG. 4 in which the sign 107 is omitted can be obtained.

Fifth Embodiment

Figure 7:
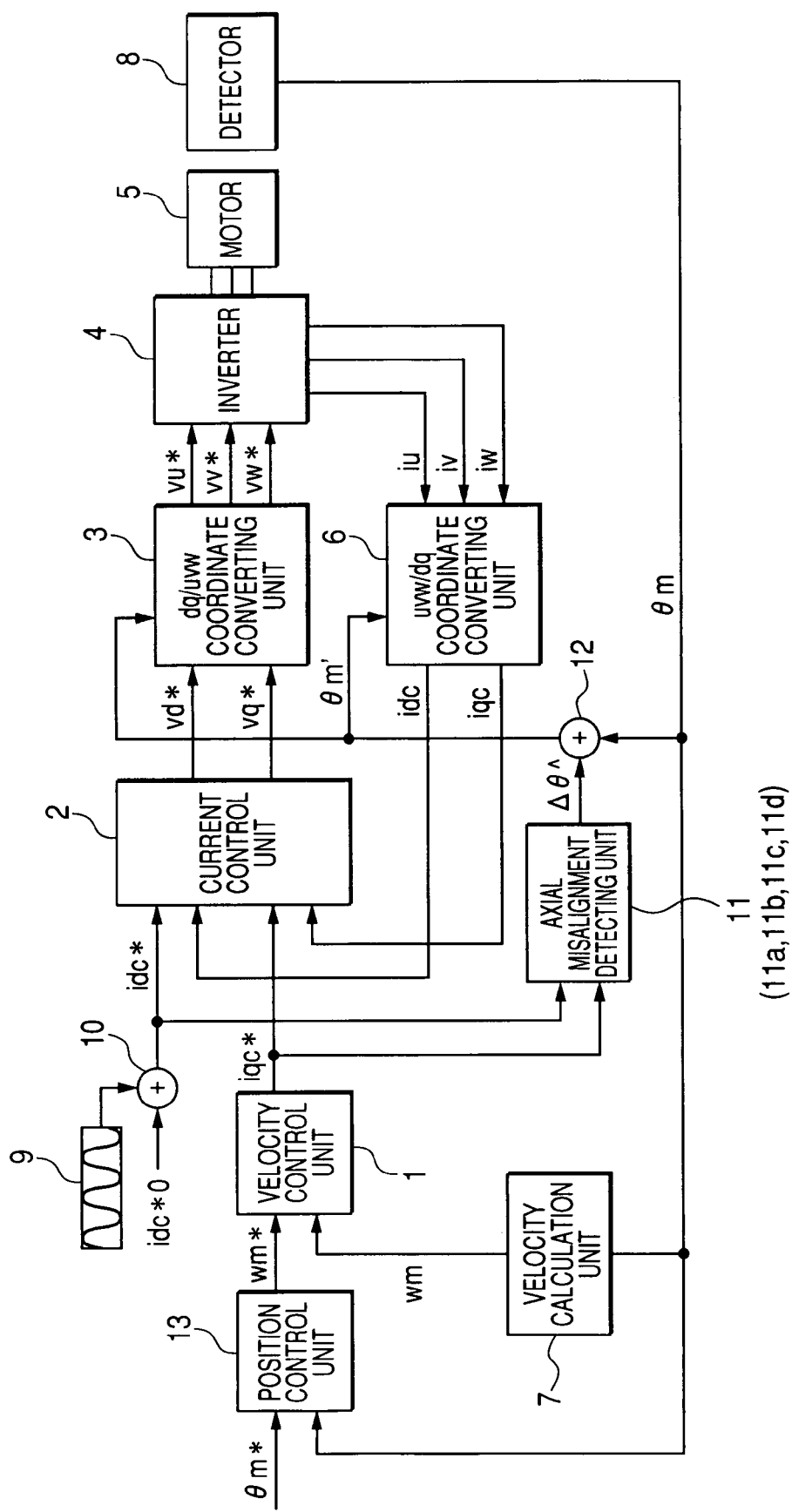
FIG. 7 is a block diagram showing the configuration of a motor control device according to a fifth embodiment of the invention.

The processing operation of a motor control device according to the fifth embodiment will be described with reference to FIG. 7. In FIG. 7, reference numerals 1 to 10, 11 ($11a$, $11b$, $11c$, and $11d$), and 12 are the same as those of FIG. 1 and the descriptions thereof will be omitted for simplicity. FIG. 7 shows a structure in which a position control unit 13 for positional control is added to the motor control device shown in FIG. 1 according to the first embodiment.

The position control unit 13 receives a position command $\theta m^*$ and an actual detected position $\theta m$, performs position control such that the detected position is aligned with the position command using P control or the like, and outputs a velocity command wm* to the velocity control unit 1.

The motor control device according to the fifth embodiment can detect the axial misalignment while performing a common position control operation.

The motor control device according to the fifth embodiment includes a position loop. Accordingly, there is no possibility that a final absolute position after axial misalignment detection or correction may be deviated. Therefore, the motor control device of this embodiment may be applied to a case in which correction is required while securing an initial absolute position, a case in which a position is not moved from an initial position, and so on.

In the motor control device according to the fifth embodiment, offset with respect to an absolute position and a position command can be monitored. Therefore, the motor control device according to the fifth embodiment can take action on such cases as the stop of an operation through alarming when offset is excessive, the change of the superimposed signal depending on an amount of offset, and so on.

Sixth Embodiment

Figure 8:
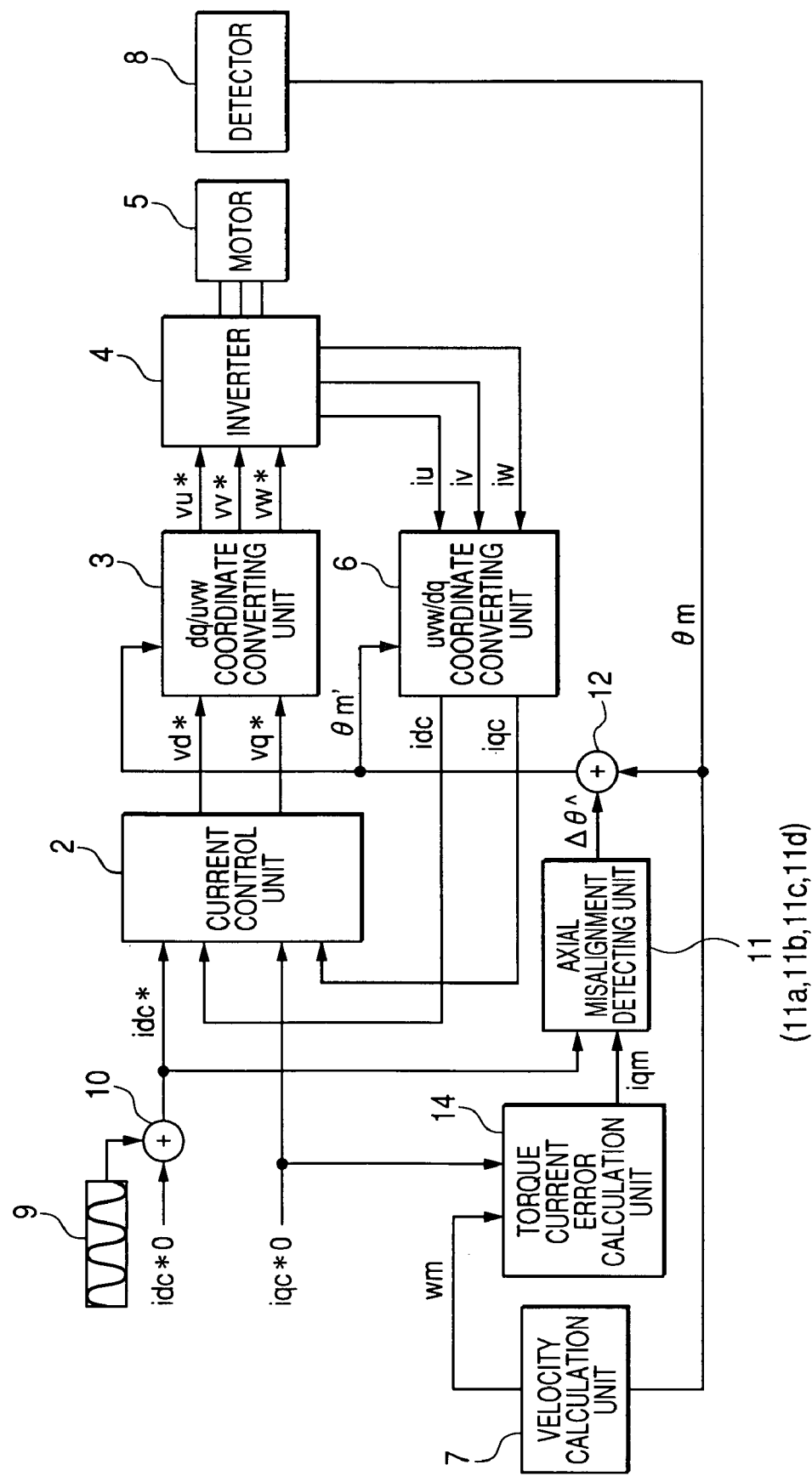
FIG. 8 is a block diagram showing the configuration of a motor control device according to a sixth embodiment of the invention.

The processing operation of a motor control device according to the sixth embodiment will be described with reference to FIG. 8. In FIG. 8, reference numerals 2 to 10, 11 ($11a$, $11b$, and $11c$), and 12 are the same as those of FIG. 1 and the descriptions thereof will be omitted for simplicity. FIG. 7 illustrates an example in which a velocity command is not used and the motor control device is used for a case where velocity control is impossible, such as being used as a torque control mode. In this embodiment, a q-axis current command iqc*0 is used.

A torque current error calculation unit 14 receives an actual velocity wm output from a velocity calculation unit 7 and the q-axis current command iqc*0 and measures torque current error iqm, which actually occurs in a motor, using a monitoring unit that processes the following equation (7).

$$iqm = (\omega c/(s+\omega c)) \cdot (iqc^*0 - J/Kt \cdot s\omega m) \tag{7}$$

Here, 's' denotes a differential operator and '$\omega c$' denotes a band of the monitoring unit.

However, '$\omega c/(s+\omega c)$' in the equation (7) may be simplified in combination with the input filter unit of the axial misalignment detecting unit.

In the motor control device according to the fifth embodiment, it is not required that the q-axis current command iqc*0 as a torque command be zero. Therefore, the motor control device according to the fifth embodiment can be used in a normal operation state including the torque command.

In this embodiment, not the q-axis current command, but the calculation value of torque current error is employed. Therefore, this embodiment can detect the axial misalignment correctly even when an absolute value of an axial misalignment angle is 90 degrees or more.

In the motor control device according to the sixth embodiment, an example including the detector has been described. It is, however, to be understood that the motor control device according to the sixth embodiment may be applied to a structure that measures a position or velocity using other method without the detector.

Seventh Embodiment

Figure 9:
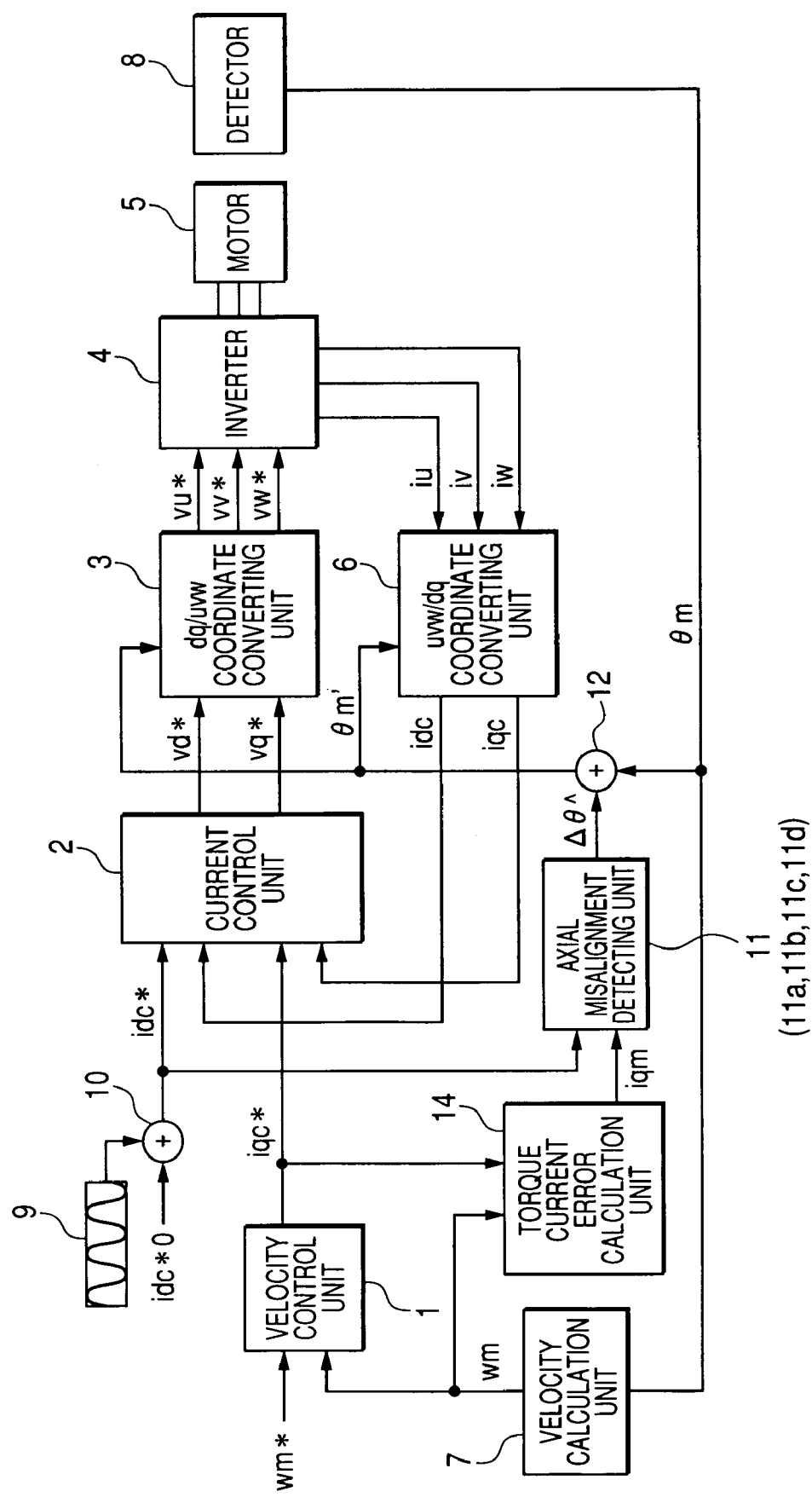
FIG. 9 is a block diagram showing the configuration of a motor control device according to a seventh embodiment of the invention.

The processing operation of a motor control device according to the seventh embodiment will be described with reference to FIG. 9. FIG. 9 shows a velocity control system in which a velocity control unit 1 is added to the motor control device shown in FIG. 8 so that axial misalignment detection can be performed while performing a velocity control operation. In FIG. 9, reference numerals 2 to 10, 11 (11a, 11b, and 11c), 12, and 14 are the same as those of FIG. 8 and the descriptions thereof will be omitted for simplicity.

In FIG. 9, a torque current error calculation unit 14 is added to the motor control device shown in FIG. 1 according to the first embodiment. The axial misalignment detecting unit 11 (11a, 11b, and 11c) receives torque current error iqm estimated at the torque current error calculation unit 14 and a d-axis current command idc* generated from the d-axis current command generating unit 10 and outputs an axial misalignment angle estimation value $\Delta\hat{\theta}$.

The torque current error calculation unit 14 receives an actual velocity wm output from the velocity calculation unit 7 and a q-axis current command iqc* output from the velocity control unit 1 and estimates the torque current error iqm that is actually generated in the motor using, for example, a monitoring unit that processes the following equation (8).

$$iqm = (\omega c/(s+\omega c)) \cdot (iqc* - J/Kt \cdot s\omega m) \qquad (8)$$

Here, 's' denotes a differential operator and '$\omega c$' denotes a band of the monitoring unit.

However, '$\omega c/(s+\omega c)$' in the equation (7) may be simplified in combination with the input filter unit of the axial misalignment detecting unit.

The axial misalignment detecting unit 11 (11a, 11b, 11c, and 11d) of the motor control device according to the first and fifth embodiments receives the q-axis current command iqc* output from the velocity control unit 1 and the d-axis current command idc* output from the d-axis current command generating unit 10 and outputs the axial misalignment angle estimation value $\Delta\hat{\theta}$. However, the axial misalignment detecting unit 11 (11a, 11b, 11c, and 11d) of the motor control device according to the seventh embodiment does not directly use the q-axis current command iqc*, but receives the torque current error iqm, which is estimated from the actual velocity wm output from the velocity calculation unit 7 and the q-axis current command iqc* output from the velocity control unit 1, and the d-axis current command idc* output from the d-axis current command generating unit 10 and outputs the axial misalignment angle estimation value $\Delta\hat{\theta}$.

In the motor control device according to the seventh embodiment, torque current error of an actual motor is calculated according to an actual velocity and axial misalignment is detected based on the torque current error. Therefore, axial misalignment detection is made possible even when a velocity control response does not rise and a velocity control band is low.

The axial misalignment detection can be carried out correctly even when an absolute value of an axial misalignment angle is 90 degrees or more because not the q-axis current command but a calculation value of torque current error is used.

Eighth Embodiment

Figure 10:
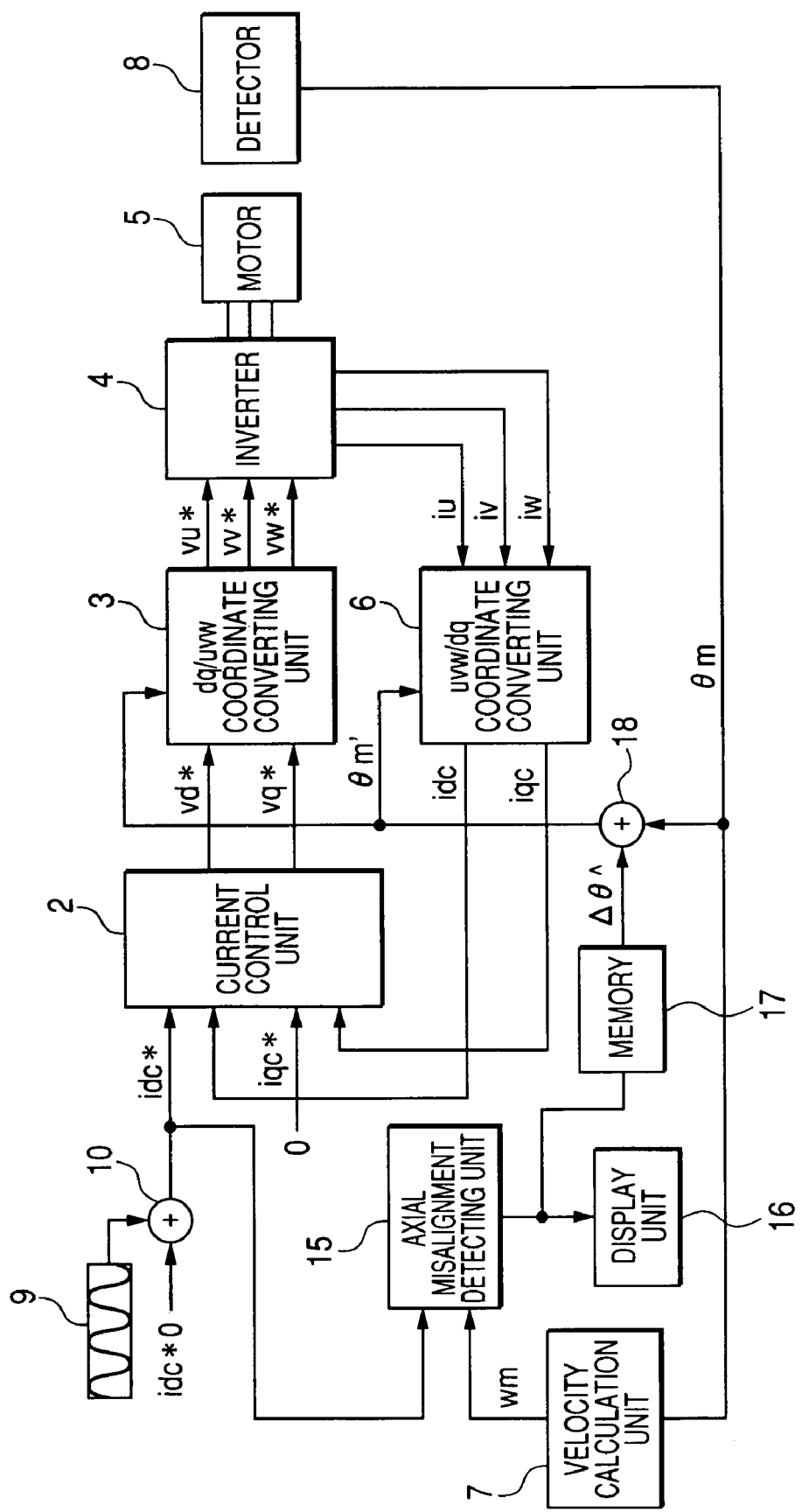
FIG. 10 is a block diagram showing the configuration of a motor control device according to an eighth embodiment of the invention.

The processing operation of a motor control device according to the seventh embodiment will be described with reference to FIG. 10. In FIG. 10, reference numerals 2 to 9 are the same as those of FIG. 8 and the descriptions thereof will be omitted for simplicity.

In the axial misalignment detection of motor control in the motor control device according to the eighth embodiment, the control is switched to a torque control mode, the q-axis current command is set to zero, and a sine wave or a triangular wave is applied to the d-axis current command.

An axial misalignment detecting unit 15 estimates an axial misalignment angle estimation value $\Delta\hat{\theta}$ from a d-axis current command idc* output from a d-axis current command generating unit 10 and an actual velocity wm output from the velocity calculation unit 7, and outputs the axial misalignment angle estimation value $\Delta\hat{\theta}$ to a display unit 16 and a memory 17. The display unit 16 displays the axial misalignment angle estimation value $\Delta\hat{\theta}$ by way of 7 segments or the like.

Then, an axial misalignment correction unit 18 receives the axial misalignment angle estimation value $\Delta\hat{\theta}$ stored in the memory 17 and an actual detected position $\theta m$ and outputs a position after correction $\theta m'$.

In the motor control device according to the eighth embodiment, the estimated axial misalignment angle estimation value $\Delta\hat{\theta}$ is displayed on the display unit 16 and is stored in the memory 17 at the same time. The estimated axial misalignment angle estimation value $\Delta\hat{\theta}$ is then added to the actual detected position $\theta m$ every time, thereby controlling axial misalignment. Therefore, the motor control device according to the eighth embodiment is advantageous in that a series of works of estimating an axial misalignment angle again after an encoder is mounted can be omitted.

In the first to eighth embodiments, if an AC component is used as the superimposed signal, the influence of low frequency disturbance depending on unbalance load, such as static friction, viscosity friction or gravity torque, can be eliminated. Accordingly, accuracy of the axial misalignment detection can be improved. In addition, an effect of operating frequency and cogging torque frequency components can be cancelled since the AC component is set to a frequency different from the operating frequency and cogging torque frequency components. In addition, an effect of operating frequency and cogging torque frequency components can be minimized even when a frequency range of an AC component is overlapped with the range of the operating frequency and cogging torque frequency components since the AC component include a plurality of frequency components.

In the first to eighth embodiments, an example in which calculation is implemented in terms of the dq-axis current has been described. It is, however, to be understood that the same advantage can be obtained if calculation is implemented in terms of the torque.

In the first to eighth embodiments, an example in which the superimposed signal is applied to the d-axis current command has been described. It is, however, to be noted that a d axis actual current or a d-axis voltage may be applied to the d-axis current command.

The superimposed signal may include a DC component or a plurality of frequency components. In this case, it is possible to increase robustness. Further, a frequency or an amount of the superimposed signal may be changed depending on the degree of position movement or velocity shift and/or an axial misalignment angle.

In the first to eighth embodiments, an example in which the q-axis current command iqc* or the torque current error iqm is used in axial misalignment detection has been described. It is, however, to be understood that the same operation can be executed allowing that a proportion term or an integral term of the velocity variation $\Delta\omega m$ or the q-axis current command is used instead of the q-axis current command iqc* or the torque current error iqm depending on conditions since the q-axis current command iqc* and the torque current error iqm are based on velocity feedback.

The synchronous motor (that is, the control target of the motor control device) may include a linear motor, a rotary motor or the like.

INDUSTRIAL APPLICABILITY

As described above, in the motor control device of the invention, axial misalignment of the synchronous motor can be detected with high accuracy. The synchronous motor can be preferably used for vector control.

The invention claimed is:

1. A motor control device comprising:
   a velocity calculation unit that calculates an actual velocity from a detected position that is a position of a motor or of a load connected to the motor, the detected position being detected by a detector;
   a velocity control unit that performs velocity control to cause the actual velocity to follow a velocity command and outputs a q-axis current command;
   a uvw/dq coordinate converting unit that receives a three-phase current detected in an inverter, performs coordinate conversion from a uvw three-phase coordinate system at rest into a dq synchronous rotation coordinate system, and outputs a d-axis current detection value and a q-axis current detection value;
   a current control unit that receives a d-axis current command, the q-axis current command, the d-axis current detection value, and the q-axis current detection value, performs current control so that a dq-axis current detection value coincides with a dq-axis current command, and outputs a d-axis voltage command and a q-axis voltage command;
   a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command;
   an inverter that receives the three-phase voltage command, applies an actual three-phase voltage to the motor, and drives the motor at a variable velocity;
   a superimposed signal generating unit that outputs a superimposed signal of a repetitive waveform, such as a triangular wave or a sine wave;
   a d-axis current command generating unit that adds the superimposed signal generated by the superimposed signal generating unit to a d-axis current command nominal value and outputs the d-axis current command; and
   an axial misalignment detecting unit that receives the d-axis current command and the q-axis current command output from the velocity control unit and outputs an axial misalignment angle estimation value.

2. The motor control device according to claim 1, further comprising a position control unit that receives a position command and the detected position detected by the detector, performs position control to cause the detected position to follow the position command, and outputs a velocity command to the velocity control unit,
   wherein the superimposed signal generating unit outputs the superimposed signal of the repetitive waveform, such as a triangular wave or a sine wave.

3. A motor control device comprising:
   a velocity calculation unit that calculates an actual velocity from a detected position that is a position of a motor or of a load connected to the motor, the detected position being detected by a detector;
   a uvw/dq coordinate converting unit that receives a three-phase current detected in an inverter, performs coordinate conversion from a uvw three-phase coordinate system at rest into a dq synchronous rotation coordinate system, and outputs a d-axis current detection value and a q-axis current detection value;
   a current control unit that receives a d-axis current command, a q-axis current command, the d-axis current detection value, and the q-axis current detection value, performs current control so that a dq-axis current detection value coincides with a dq-axis current command, and outputs a d-axis voltage command and a q-axis voltage command;
   a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command;
   an inverter that receives the three-phase voltage command, applies an actual three-phase voltage to the motor, and drives the motor at a variable velocity;
   a superimposed signal generating unit that outputs a superimposed signal of a repetitive waveform, such as a triangular wave or a sine wave;
   a d-axis current command generating unit that adds the superimposed signal generated by the superimposed signal generating unit to a d-axis current command nominal value and outputs the d-axis current command;
   a torque current error calculation unit that receives the actual velocity output from the velocity calculation unit and the q-axis current command, and estimates a torque current error actually occurring in the motor; and
   an axial misalignment detecting unit that receives the d-axis current command and the torque current error, and outputs an axial misalignment angle estimation value.

4. The motor control device according to claim 3, further comprising a velocity control unit that performs velocity control to cause the actual velocity to follow a velocity command, and outputs the q-axis current command,
   wherein the superimposed signal generating unit outputs the superimposed signal of the repetitive waveform, such as a triangular wave or a sine wave.

5. The motor control device according to claim 1, further comprising an axial misalignment correction unit that receives the axial misalignment angle estimation value output from the axial misalignment detecting unit and the detected position detected by the detector, calculates a position after correction, and outputs the calculated position to the dq/uvw coordinate converting unit and the uvw/dq coordinate converting unit,
   wherein the dq/uvw coordinate converting unit and the uvw/dq coordinate converting unit perform the coordinate conversion on the basis of the position after correction.

6. The motor control device according to claim 5, wherein the axial misalignment detecting unit includes:
   a first input filter that filters the d-axis current command and outputs a d-axis signal for axial misalignment detection,
   a second input filter that filters the q-axis current command or torque current error and outputs a q-axis signal for axial misalignment detection, an adaptive input calculation unit that calculates an adaptive input by multiplying the d-axis signal for axial misalignment detection by the q-axis signal for axial misalignment detection, a gain unit that multiplies the adaptive input by a gain and generates an integral input, and an integrator that integrates the integral input and outputs the axial misalignment angle estimation value.

7. The motor control device according to claim 5, wherein the axial misalignment detecting unit includes:

a first input filter that filters the d-axis current command and outputs a d-axis signal for axial misalignment detection, a variable gain calculation unit that calculates a function of the d-axis signal for axial misalignment detection, a second input filter that filters the q-axis current command or torque current error and outputs a q-axis signal for axial misalignment detection, an adaptive input calculation unit that calculates an adaptive input by multiplying the function of the d-axis signal for axial misalignment detection and the q-axis signal for axial misalignment detection, and an integrator that integrates the integral input and outputs the axial misalignment angle estimation value.

8. The motor control device according to claim 5, wherein the axial misalignment detecting unit includes:

a first input filter that filters the d-axis current command and outputs a d-axis signal for axial misalignment detection, a first sign detector that detects a sign of the d-axis signal for axial misalignment detection and outputs a sign-added d-axis signal for axial misalignment detection, a second input filter that filters the q-axis current command or torque current error and outputs a q-axis signal for axial misalignment detection, a second sign detector that detects a sign of the q-axis signal for axial misalignment detection and outputs a sign-added q-axis signal for axial misalignment detection, an adaptive input calculation unit that calculates a sign-added adaptive input by multiplying the sign-added d-axis signal for axial misalignment detection by the sign-added q-axis signal for axial misalignment detection, a gain unit that multiplies the sign-added adaptive input by a gain and generates an integral input, and an integrator that integrates the integral input and outputs the axial misalignment angle estimation value.

9. The motor control device according to claim 5, wherein the axial misalignment detecting unit includes:

a first input filter that filters the d-axis current command and outputs a d-axis signal for axial misalignment detection, a second input filter that filters the q-axis current command or torque current error and outputs a q-axis signal for axial misalignment detection, an estimation output calculation unit that multiplies the d-axis signal for axial misalignment detection filtered by the input filter by the axial misalignment angle estimation value to be described below, and outputs an estimation output, an axial misalignment error calculation unit that finds a difference between the q-axis signal for axial misalignment detection filtered by the second input filter and the estimation output from the estimation output calculation unit and outputs an axial misalignment error, a variable gain unit that multiplies the axial misalignment error output from the axial misalignment error calculation unit by a gain and outputs an integral input, and an integrator that integrates the integral input output from the variable gain unit to obtain the axial misalignment angle estimation value.

10. A motor control device comprising:

a velocity calculation unit that calculates an actual velocity from a detected position that is a position of a motor or of a load connected to the motor, the detected position being detected by a detector;

a uvw/dq coordinate converting unit that receives a three-phase current detected in an inverter, performs coordinate conversion from a uvw three-phase coordinate system at rest into a dq synchronous rotation coordinate system, and outputs a d-axis current detection value and a q-axis current detection value;

a current control unit that receives a d-axis current command, a q-axis current command, the d-axis current detection value, and the q-axis current detection value, performs current control such that a dq-axis current detection value coincides with a dq-axis current command, and outputs a d-axis voltage command and a q-axis voltage command;

a dq/uvw coordinate converting unit that receives the d-axis voltage command, the q-axis voltage command, and the detected position, performs coordinate conversion from the dq synchronous rotation coordinate system into the uvw three-phase coordinate system at rest, and outputs a three-phase voltage command;

an inverter that receives the three-phase voltage command, applies an actual three-phase voltage to the motor, and drives the motor at a variable velocity;

a superimposed signal generating unit that sets the q-axis current command to zero and outputs a superimposed signal of a repetitive waveform, such as a triangular wave or a sine wave;

a d-axis current command generating unit that adds the superimposed signal generated by the superimposed signal generating unit to the d-axis current command and outputs the d-axis current command;

an axial misalignment detecting unit that receives the d-axis current command and the q-axis current command and outputs an axial misalignment angle estimation value;

a display unit that displays the axial misalignment angle estimation value;

a memory that stores the axial misalignment angle estimation value; and an axial misalignment correction unit that receives the axial misalignment angle estimation value stored in the memory and the detected position, and outputs a position after correction.

11. The motor control device according to claim 3, further comprising an axial misalignment correction unit that receives the axial misalignment angle estimation value output from the axial misalignment detecting unit and the detected position detected by the detector, calculates a position after correction, and outputs the calculated position to the dq/uvw coordinate converting unit and the uvw/dq coordinate converting unit, wherein the dq/uvw coordinate converting unit and the uvw/dq coordinate converting unit perform the coordinate conversion on the basis of the position after correction.

12. The motor control device according to claim 11, wherein the axial misalignment detecting unit includes:

a first input filter that filters the d-axis current command and outputs a d-axis signal for axial misalignment detection, a second input filter that filters the q-axis current command or torque current error and outputs a q-axis signal for axial misalignment detection, an adaptive input calculation unit that calculates an adaptive input by multiplying the d-axis signal for axial misalignment detection by the q-axis signal for axial misalignment detection, a gain unit that multiplies the adaptive input by a gain and generates an integral input, and an integrator that integrates the integral input and outputs the axial misalignment angle estimation value.

13. The motor control device according to claim 11, wherein the axial misalignment detecting unit includes:

a first input filter that filters the d-axis current command and outputs a d-axis signal for axial misalignment detection, a variable gain calculation unit that calculates a function of the d-axis signal for axial misalignment detection, a second input filter that filters the q-axis current command or torque current error and outputs a q-axis signal for axial misalignment detection, an adaptive input calculation unit that calculates an adaptive input by multiplying the function of the d-axis signal for axial misalignment detection and the q-axis signal for axial misalignment detection, and an integrator that integrates the integral input and outputs the axial misalignment angle estimation value.

14. The motor control device according to claim 11, wherein the axial misalignment detecting unit includes:

a first input filter that filters the d-axis current command and outputs a d-axis signal for axial misalignment detection, a first sign detector that detects a sign of the d-axis signal for axial misalignment detection and outputs a sign-added d-axis signal for axial misalignment detection, a second input filter that filters the q-axis current command or torque current error and outputs a q-axis signal for axial misalignment detection, a second sign detector that detects a sign of the q-axis signal for axial misalignment detection and outputs a sign-added q-axis signal for axial misalignment detection, an adaptive input calculation unit that calculates a sign-added adaptive input by multiplying the sign-added d-axis signal for axial misalignment detection by the sign-added q-axis signal for axial misalignment detection, a gain unit that multiplies the sign-added adaptive input by a gain and generates an integral input, and an integrator that integrates the integral input and outputs the axial misalignment angle estimation value.

15. The motor control device according to claim 11, wherein the axial misalignment detecting unit includes:

a first input filter that filters the d-axis current command and outputs a d-axis signal for axial misalignment detection, a second input filter that filters the q-axis current command or torque current error and outputs a q-axis signal for axial misalignment detection, an estimation output calculation unit that multiplies the d-axis signal for axial misalignment detection filtered by the input filter by the axial misalignment angle estimation value to be described below, and outputs an estimation output, an axial misalignment error calculation unit that finds a difference between the q-axis signal for axial misalignment detection filtered by the second input filter and the estimation output from the estimation output calculation unit and outputs an axial misalignment error, a variable gain unit that multiplies the axial misalignment error output from the axial misalignment error calculation unit by a gain and outputs an integral input, and an integrator that integrates the integral input output from the variable gain unit to obtain the axial misalignment angle estimation value.

16. The motor control device according to claim 1, wherein the axial misalignment detecting unit includes:

a first input filter that filters the d-axis current command and outputs a d-axis signal for axial misalignment detection, a second input filter that filters the q-axis current command or torque current error and outputs a d-axis signal for axial misalignment detection, an estimation output calculation unit that multiplies the d-axis signal for axial misalignment detection filtered by the input filter by the axial misalignment angle estimation value to be described below, and outputs an estimation output, an axial misalignment error calculation unit that finds a difference between the q-axis signal for axial misalignment detection filtered by the second input filter and the estimation output from the estimation output calculation unit and Outputs an axial misalignment error, a variable gain unit that multiplies the axial misalignment error output from the axial misalignment error calculation unit by a gain and outputs an integral input, and an integrator that integrates the integral input output from the variable gain unit to obtain the axial misalignment angle estimation value.

17. The motor control device according to claim 3, wherein the axial misalignment detecting unit includes:

a first input filter that filters the d-axis current command and outputs a d-axis signal for axial misalignment detection, a second input filter that filters the q-axis current command or torque current error and outputs a q-axis signal for axial misalignment detection, an estimation output calculation unit that multiplies the d-axis signal for axial misalignment detection filtered by the input filter by the axial misalignment angle estimation value to be described below, and outputs an estimation output, an axial misalignment error calculation unit that finds a difference between the q-axis signal for axial misalignment detection filtered by the second input filter and the estimation output from the estimation output calculation unit and outputs an axial misalignment error, a variable gain unit that multiplies the axial misalignment error output from the axial misalignment error calculation unit by a gain and outputs an integral input, and an integrator that integrates the integral input output from the variable gain unit to obtain the axial misalignment angle estimation value.

* * * * *